(12) United States Patent
Wolrich et al.

(10) Patent No.: US 7,191,309 B1
(45) Date of Patent: Mar. 13, 2007

(54) DOUBLE SHIFT INSTRUCTION FOR MICRO ENGINE USED IN MULTITHREADED PARALLEL PROCESSOR ARCHITECTURE

(75) Inventors: Gilbert Wolrich, Framingham, MA (US); Matthew I. Adiletta, Worcester, MA (US); William Wheeler, Southborough, MA (US); Debra Bernstein, Sudbury, MA (US); Donald Hooper, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/070,006
(22) PCT Filed: Aug. 31, 2000
(86) PCT No.: PCT/US00/23982
§ 371 (c)(1),
(2), (4) Date: May 13, 2003
(87) PCT Pub. No.: WO01/16758
PCT Pub. Date: Mar. 8, 2001

Related U.S. Application Data
(60) Provisional application No. 60/151,961, filed on Sep. 1, 1999.

(51) Int. Cl.
G06F 9/315 (2006.01)
G06F 9/32 (2006.01)

(52) U.S. Cl. .................. 711/220; 711/200; 711/212; 341/67

(58) Field of Classification Search .............. 341/67; 380/28; 713/170; 711/200, 212, 220
See application file for complete search history.

(56) References Cited

U.S. PATENT DOCUMENTS

| | | | |
|---|---|---|---|
| 3,373,408 | A | 3/1968 | Ling |
| 3,478,322 | A | 11/1969 | Evans |
| 3,792,441 | A | 2/1974 | Wymore et al. |
| 3,913,074 | A | 10/1975 | Homberg et al. |
| 3,940,745 | A | 2/1976 | Sajeva |

(Continued)

FOREIGN PATENT DOCUMENTS

| | | |
|---|---|---|
| EP | 0 379 709 | 8/1990 |
| EP | 0 464 715 | 1/1992 |
| EP | 0 633 678 | 1/1995 |
| EP | 0 745 933 | 12/1996 |
| EP | 0 809 180 | 11/1997 |

(Continued)

OTHER PUBLICATIONS

Wadler, Philip. "The Concatenate Vanishes". University of Glasgow, Dec. 1987 (revised Nov. 1989), pp. 1–7.*

Wolrich et al. U.S. Appl. No. 09/473,571, filed Dec. 28, 1999.

Wolrich et al. U.S. Appl. No. 09/475,614, filed Dec. 30, 1999.

Wolrich et al. U.S. Appl. No. 09/476,303, filed Dec. 30, 1999.

(Continued)

*Primary Examiner*—B. James Peikari
(74) *Attorney, Agent, or Firm*—Fish & Richardson P.C.

(57) ABSTRACT

A method of operating a processor includes concatenating a first word and a second word to produce an intermediate result, shifting the intermediate result by a specified shift amount and storing the shifted intermediate result in a third word, to create an address.

10 Claims, 6 Drawing Sheets

U.S. PATENT DOCUMENTS

| | | | |
|---|---|---|---|
| 4,023,023 A | * 5/1977 | Bourrez et al. ............ 708/490 |
| 4,130,890 A | 12/1978 | Adam |
| 4,392,758 A | 7/1983 | Bowles et al. |
| 4,400,770 A | 8/1983 | Chan et al. |
| 4,514,807 A | 4/1985 | Nogi |
| 4,523,272 A | 6/1985 | Fukunaga et al. |
| 4,724,521 A | 2/1988 | Carron et al. |
| 4,745,544 A | 5/1988 | Renner et al. |
| 4,777,587 A | 10/1988 | Case et al. |
| 4,866,664 A | 9/1989 | Burkhardt, Jr. et al. |
| 5,073,864 A | 12/1991 | Methvin et al. |
| 5,113,516 A | * 5/1992 | Johnson ...................... 710/65 |
| 5,140,685 A | 8/1992 | Sipple et al. |
| 5,142,683 A | 8/1992 | Burkhardt, Jr. et al. |
| 5,155,831 A | 10/1992 | Emma et al. |
| 5,155,854 A | 10/1992 | Flynn et al. |
| 5,168,555 A | 12/1992 | Byers et al. |
| 5,173,897 A | 12/1992 | Schrodi et al. |
| 5,255,239 A | 10/1993 | Taborn et al. |
| 5,263,169 A | 11/1993 | Genusov et al. |
| 5,347,648 A | 9/1994 | Stamm et al. |
| 5,357,617 A | 10/1994 | Davis et al. |
| 5,363,448 A | * 11/1994 | Koopman et al. .......... 713/170 |
| 5,367,678 A | 11/1994 | Lee et al. |
| 5,390,329 A | 2/1995 | Gaertner et al. |
| 5,392,391 A | 2/1995 | Caulk, Jr. et al. |
| 5,392,411 A | 2/1995 | Ozaki |
| 5,392,412 A | 2/1995 | McKenna |
| 5,404,464 A | 4/1995 | Bennett |
| 5,404,482 A | 4/1995 | Stamm et al. |
| 5,428,809 A | 6/1995 | Coffin et al. |
| 5,432,918 A | 7/1995 | Stamm |
| 5,436,626 A | * 7/1995 | Fujiwara et al. ............... 341/67 |
| 5,442,756 A | 8/1995 | Grochowski et al. |
| 5,448,702 A | 9/1995 | Garcia, Jr. et al. |
| 5,450,351 A | 9/1995 | Heddes |
| 5,452,437 A | 9/1995 | Richey et al. |
| 5,459,842 A | 10/1995 | Begun et al. |
| 5,463,625 A | 10/1995 | Yasrebi |
| 5,467,452 A | 11/1995 | Blum et al. |
| 5,481,683 A | 1/1996 | Karim |
| 5,487,159 A | 1/1996 | Byers et al. |
| 5,517,628 A | 5/1996 | Morrison et al. |
| 5,517,648 A | 5/1996 | Bertone et al. |
| 5,542,070 A | 7/1996 | LeBlanc et al. |
| 5,542,088 A | 7/1996 | Jennings, Jr. et al. |
| 5,544,236 A | 8/1996 | Andruska et al. |
| 5,550,816 A | 8/1996 | Hardwick et al. |
| 5,557,766 A | 9/1996 | Takiguchi et al. |
| 5,568,617 A | 10/1996 | Kametani |
| 5,574,922 A | 11/1996 | James |
| 5,574,939 A | 11/1996 | Keckler et al. |
| 5,592,622 A | 1/1997 | Isfeld et al. |
| 5,600,812 A | * 2/1997 | Park ............................ 711/200 |
| 5,606,676 A | 2/1997 | Grochowski et al. |
| 5,613,071 A | 3/1997 | Rankin et al. |
| 5,613,136 A | 3/1997 | Casavant et al. |
| 5,623,489 A | 4/1997 | Cotton et al. |
| 5,627,829 A | 5/1997 | Gleeson et al. |
| 5,630,130 A | 5/1997 | Perotto et al. |
| 5,644,623 A | 7/1997 | Gulledge |
| 5,649,157 A | 7/1997 | Williams |
| 5,652,583 A | * 7/1997 | Kang ........................... 341/67 |
| 5,659,687 A | 8/1997 | Kim et al. |
| 5,659,722 A | 8/1997 | Blaner et al. |
| 5,680,641 A | 10/1997 | Sidman |
| 5,689,566 A | 11/1997 | Nguyen |
| 5,692,167 A | 11/1997 | Grochowski et al. |
| 5,699,537 A | 12/1997 | Sharangpani et al. |
| 5,717,760 A | * 2/1998 | Satterfield ................... 380/28 |
| 5,717,898 A | 2/1998 | Kagan et al. |
| 5,721,870 A | 2/1998 | Matsumoto |
| 5,742,587 A | 4/1998 | Zornig et al. |
| 5,742,782 A | 4/1998 | Ito et al. |
| 5,742,822 A | 4/1998 | Motomura |
| 5,745,913 A | 4/1998 | Pattin et al. |
| 5,751,987 A | 5/1998 | Mahant-Shetti et al. |
| 5,761,507 A | 6/1998 | Govett |
| 5,761,522 A | 6/1998 | Hisanaga et al. |
| 5,781,774 A | 7/1998 | Krick |
| 5,784,649 A | 7/1998 | Begur et al. |
| 5,784,712 A | 7/1998 | Byers et al. |
| 5,796,413 A | 8/1998 | Shipp et al. |
| 5,797,043 A | 8/1998 | Lewis et al. |
| 5,809,235 A | 9/1998 | Sharma et al. |
| 5,809,530 A | 9/1998 | Samra et al. |
| 5,812,839 A | 9/1998 | Hoyt et al. |
| 5,812,868 A | 9/1998 | Moyer et al. |
| 5,828,746 A | 10/1998 | Ardon |
| 5,828,863 A | 10/1998 | Barrett et al. |
| 5,832,215 A | 11/1998 | Kato et al. |
| 5,835,755 A | 11/1998 | Stellwagen, Jr. |
| 5,854,922 A | 12/1998 | Gravenstein et al. |
| 5,860,158 A | 1/1999 | Pai et al. |
| 5,886,992 A | 3/1999 | Raatikainen et al. |
| 5,887,134 A | 3/1999 | Ebrahim |
| 5,890,208 A | 3/1999 | Kwon |
| 5,892,979 A | 4/1999 | Shiraki et al. |
| 5,905,876 A | 5/1999 | Pawlowski et al. |
| 5,905,889 A | 5/1999 | Wilhelm, Jr. |
| 5,915,123 A | 6/1999 | Mirsky et al. |
| 5,933,627 A | 8/1999 | Parady |
| 5,937,187 A | 8/1999 | Kosche et al. |
| 5,938,736 A | 8/1999 | Muller et al. |
| 5,940,612 A | 8/1999 | Brady et al. |
| 5,940,866 A | 8/1999 | Chisholm et al. |
| 5,946,487 A | 8/1999 | Dangelo |
| 5,948,081 A | 9/1999 | Foster |
| 5,951,679 A | 9/1999 | Anderson et al. |
| 5,958,031 A | 9/1999 | Kim |
| 5,961,628 A | 10/1999 | Nguyen et al. |
| 5,970,013 A | 10/1999 | Fischer et al. |
| 5,978,838 A | 11/1999 | Mohamed et al. |
| 5,983,274 A | 11/1999 | Hyder et al. |
| 5,996,068 A | 11/1999 | Dwyer, III et al. |
| 6,002,881 A | 12/1999 | York et al. |
| 6,009,515 A | 12/1999 | Steele, Jr. |
| 6,012,151 A | 1/2000 | Mano |
| 6,014,729 A | 1/2000 | Lannan et al. |
| 6,023,742 A | 2/2000 | Ebeling et al. |
| 6,029,228 A | 2/2000 | Cai et al. |
| 6,058,168 A | 5/2000 | Braband |
| 6,058,465 A | 5/2000 | Nguyen |
| 6,067,585 A | 5/2000 | Hoang |
| 6,070,231 A | 5/2000 | Ottinger |
| 6,072,781 A | 6/2000 | Feeney et al. |
| 6,073,215 A | 6/2000 | Snyder |
| 6,076,158 A | 6/2000 | Sites et al. |
| 6,079,008 A | 6/2000 | Clery, III |
| 6,079,014 A | 6/2000 | Papworth et al. |
| 6,085,215 A | 7/2000 | Ramakrishnan et al. |
| 6,085,294 A | 7/2000 | Van Doren et al. |
| 6,092,127 A | 7/2000 | Tausheck |
| 6,092,158 A | 7/2000 | Harriman et al. |
| 6,092,175 A | 7/2000 | Levy et al. |
| 6,112,016 A | 8/2000 | MacWilliams et al. |
| 6,115,811 A | 9/2000 | Steele, Jr. |
| 6,134,665 A | 10/2000 | Klein et al. |
| 6,141,689 A | 10/2000 | Yasrebi |
| 6,141,765 A | 10/2000 | Sherman |
| 6,144,669 A | 11/2000 | Williams et al. |

| | | |
|---|---|---|
| 6,145,054 A | 11/2000 | Mehrotra et al. |
| 6,157,955 A | 12/2000 | Narad et al. |
| 6,160,562 A | 12/2000 | Chin et al. |
| 6,182,177 B1 | 1/2001 | Harriman |
| 6,195,676 B1 | 2/2001 | Spix et al. |
| 6,199,133 B1 | 3/2001 | Schnell |
| 6,201,807 B1 | 3/2001 | Prasanna |
| 6,212,542 B1 | 4/2001 | Kahle et al. |
| 6,212,611 B1 | 4/2001 | Nizar et al. |
| 6,216,220 B1 | 4/2001 | Hwang |
| 6,223,207 B1 | 4/2001 | Lucovsky et al. |
| 6,223,238 B1 | 4/2001 | Meyer et al. |
| 6,223,279 B1 | 4/2001 | Nishimura et al. |
| 6,247,025 B1 | 6/2001 | Bacon |
| 6,256,713 B1 | 7/2001 | Audityan et al. |
| 6,272,616 B1 | 8/2001 | Fernando et al. |
| 6,275,505 B1 | 8/2001 | O'Loughlin et al. |
| 6,279,113 B1 | 8/2001 | Vaidya |
| 6,289,011 B1 | 9/2001 | Seo et al. |
| 6,298,370 B1 | 10/2001 | Tang et al. |
| 6,307,789 B1 | 10/2001 | Wolrich et al. |
| 6,324,624 B1 | 11/2001 | Wolrich et al. |
| 6,345,334 B1 | 2/2002 | Nakagawa et al. |
| 6,347,344 B1 | 2/2002 | Baker et al. |
| 6,351,808 B1 | 2/2002 | Joy et al. |
| 6,356,962 B1 | 3/2002 | Kasper et al. |
| 6,360,262 B1 | 3/2002 | Guenthner et al. |
| 6,373,848 B1 | 4/2002 | Allison et al. |
| 6,389,449 B1 | 5/2002 | Nemirovsky et al. |
| 6,393,483 B1 | 5/2002 | Latif et al. |
| 6,415,338 B1 | 7/2002 | Habot |
| 6,426,940 B1 | 7/2002 | Seo et al. |
| 6,427,196 B1 | 7/2002 | Adiletta et al. |
| 6,430,626 B1 | 8/2002 | Witkowski et al. |
| 6,434,145 B1 | 8/2002 | Opsasnick et al. |
| 6,463,072 B1 | 10/2002 | Wolrich et al. |
| 6,532,509 B1 | 3/2003 | Wolrich et al. |
| 6,552,826 B2 | 4/2003 | Adler et al. |
| 6,560,667 B1 | 5/2003 | Wolrich et al. |
| 6,577,542 B2 | 6/2003 | Wolrich et al. |
| 6,584,522 B1 | 6/2003 | Wolrich et al. |
| 6,587,906 B2 | 7/2003 | Wolrich et al. |
| 6,606,704 B1 | 8/2003 | Adiletta et al. |
| 6,625,654 B1 | 9/2003 | Wolrich et al. |
| 6,629,237 B2 | 9/2003 | Wolrich et al. |
| 6,631,430 B1 | 10/2003 | Wolrich et al. |
| 6,631,462 B1 | 10/2003 | Wolrich et al. |
| 6,661,794 B1 | 12/2003 | Wolrich et al. |
| 6,667,920 B2 | 12/2003 | Wolrich et al. |
| 6,668,317 B1 | 12/2003 | Bernstein et al. |
| 6,681,300 B2 | 1/2004 | Wolrich et al. |
| 6,694,380 B1 | 2/2004 | Wolrich et al. |
| 2002/0053017 A1 | 5/2002 | Adiletta et al. |
| 2002/0056037 A1 | 5/2002 | Wolrich et al. |
| 2003/0041228 A1 | 2/2003 | Rosenbluth et al. |
| 2003/0145159 A1 | 7/2003 | Adiletta et al. |
| 2003/0191866 A1 | 10/2003 | Wolrich et al. |
| 2004/0039895 A1 | 2/2004 | Wolrich et al. |
| 2004/0054880 A1 | 3/2004 | Bernstein et al. |
| 2004/0071152 A1 | 4/2004 | Wolrich et al. |
| 2004/0073728 A1 | 4/2004 | Wolrich et al. |
| 2004/0073778 A1 | 4/2004 | Adiletta et al. |
| 2004/0098496 A1 | 5/2004 | Wolrich et al. |
| 2004/0109369 A1 | 6/2004 | Wolrich et al. |
| 2004/0205747 A1 | 10/2004 | Bernstein et al. |

FOREIGN PATENT DOCUMENTS

| | | | |
|---|---|---|---|
| JP | 59111533 | * | 6/1984 |
| WO | WO 94/15287 | | 7/1994 |
| WO | WO 97/38372 | | 10/1997 |
| WO | WO 01/16697 | | 3/2001 |
| WO | WO 01/16698 | | 3/2001 |
| WO | WO 01/16702 | | 3/2001 |
| WO | WO 01/16703 | | 3/2001 |
| WO | WO 01/16713 | | 3/2001 |
| WO | WO 01/16714 | | 3/2001 |
| WO | WO 01/16715 | | 3/2001 |
| WO | WO 01/16716 | | 3/2001 |
| WO | WO 01/16718 | | 3/2001 |
| WO | WO 01/16722 | | 3/2001 |
| WO | WO 01/16758 | | 3/2001 |
| WO | WO 01/16769 | | 3/2001 |
| WO | WO 01/16770 | | 3/2001 |
| WO | WO 01/16782 | | 3/2001 |
| WO | WO 01/18646 | | 3/2001 |
| WO | WO 01/41530 | | 6/2001 |
| WO | WO 01/48596 | | 7/2001 |
| WO | WO 01/48599 | | 7/2001 |
| WO | WO 01/48606 | | 7/2001 |
| WO | WO 01/48619 | | 7/2001 |
| WO | WO 01/50247 | | 7/2001 |
| WO | WO 01/50679 | | 7/2001 |

OTHER PUBLICATIONS

Adiletta et al. U.S. Appl. No. 09/387,109, filed Aug. 31, 1999.

Bernstein et al. U.S. Appl. No. 09/747,019, filed Dec. 21, 2000.

Romilly Bowden. "What is HART?" Romilly's HART® and Fieldbus Web Site, 1997. <URL: http://www.romilly.co.uk/whathart.htm>.

Agarwal et al., "April: A Processor Architecutre for Multi-processing," Proceedings of the $17^{th}$ Annual International Symposium on Computer Architecutre, IEEE, pp. 104–114.

Byrd et al., "Multithread Processor Architectures," *IEEE Spectrum*, vol. 32, No. 8, New York, Aug. 1, 1995, pp. 38–46.

Doyle et al., *Microsoft Press Computer Dictionary*, $2^{nd}$ ed., Microsoft Press, Redmond, Washington, USA, 1994, p. 326.

Farkas et al., "The multicluster architecture: reducing cycle time through partitioning," IEEE, vol. 30 , Dec. 1997, pp. 149–159.

Fillo et al., "The M-Machine Multicomputer," IEEE Proceedings of MICRO–28, 1995, pp. 146–156.

Gomez et al., "Efficient Multithreaded User–Space Transport for Network Computing: Design and Test of the TRAP Protocol," *Journal of Parallel and Distributed Computing*, Academic Press, Duluth, Minnesota, USA, vol. 40 No. 1, Jan. 10, 1997, pp. 103–117.

Haug et al., "Reconfigurable hardware as shared resource for parallel threads," IEEE Symposium on FPGAs for Custom Computing Machines, 1998.

Hauser et al., "Garp: a MIPS processor with a reconfigurable coprocessor," Proceedings of the $5^{th}$ Annual IEEE Symposium on Field–Programmable Custom Computing Machines, 1997.

Hennessy et al., "Computer Organization and Design: The Hardware/Software Interface," Morgan Kaufman Publishers, pp. 476–482 (1998).

Hyde, R., "Overview of Memory Management," *Byte*, vol. 13, No. 4, 1998, pp. 219–225.

Keckler et al., "Exploiting fine grain thread level parallelism on the MIT multi–ALU processor," IEEE, Jun. 1998.

Litch et al., "StrongARMing Portable Communications," IEEE Micro, 1998, pp. 48–55.

Mendelson et al., "Design Alternatives of Multithreaded Architecture," *International Journal of Parallel Programming*, vol. 27, No. 3,Plenum Press, New York, USA, Jun. 1999, pp. 161–193.

Paver et al., "Register Locking in Asynchronous Processor Computer Design: VLSI Processors," ICCD '92 Proceedings, IEEE 1992 International Conference, 1992, pp. 385–398.

Schmidt et al., "The Performance of Alternative Threading Architectures for Parallel Communication Subsystems," Internet Document, *Online*!, Nov. 13, 1998.

Thistle et al., "A Processor Architecture for Horizon," IEEE, 1998, pp. 35–41.

Tremblay et al., "A Three Dimensional Register File for Superscalar Processors," IEEE Proceedings of the 28$^{th}$ Annual Hawaii International Conference on System Sciences, 1995, pp. 191–201.

Trimberger et al, "A time–multiplexed FPGA, " Proceedings of the 5$^{th}$ Annual IEEE Symposium on Field–Programmable Custom Computing Machines, 1998.

Turner et al., "Design of a High Performance Active Router," Internet Document, *Online*, Mar. 18, 1999.

Vibhatavanijt et al., "Simultaneous Multithreading–Based Routers," Proceedings of the 2000 International Conference of Parallel Processing, Toronto, Ontario, Canada, Aug. 21–24, 2000, pp. 362–359.

Waldspurger et al., "Register Relocation: Flexible Contents for Multithreading," Proceedings of the 20$^{th}$ Annual International Symposium on Computer Architecture, 1993, pp. 120–130.

Wazlowski et al., "PRISM–II computer and architecture," IEEE Proceedings, Workshop on FPGAs for Custom Computing Machines, 1993.

Wadler. "The Concatenate Vanishes". University of Glasgow, Nov. 1989, pp. 1–7.

Schmidt et al. "The Performance of Alternative Threading Architectures for Parallel Communication Subsytems". Submitted to Journal of Parallel and Distributed Computing, pp. 1–19.

Moors, et al. Cascading Content–Addressable Memories. IEEE 12(3):56–66, Jun. 1992.

"HART Field Communication Protocol –Application Guide", HART Communications Foundation, pp. 1–74, 1999.

* cited by examiner

| ALU/SHIFT (set cc) | 31 30 29 28 27 | 26 25 24 23 | 22 21 | 20 19 18 17 | 16 15 14 13 | 12 11 10 9 | 8 7 | 6 | 5 | 4 3 2 1 0 |
|---|---|---|---|---|---|---|---|---|---|---|
| | 0 0 sw | rel dest reg | shift amount | rs | A rel source | B rel source | ro | im | Bi | ALUop |

| ALU/SHIFT (set cc) | 31 30 29 28 27 | 26 25 24 23 | 22 21 | 20 19 18 17 | 16 15 14 13 | 12 11 10 9 | 8 7 | 6 | 5 | 4 3 2 1 0 |
|---|---|---|---|---|---|---|---|---|---|---|
| | 0 0 sw | rel dest reg | shift amount | | A rel source | B rel source | | 1 | 0 | ALUop |

| ALU/SHIFT (set cc) | 31 30 29 28 27 | 26 25 24 23 | 22 21 | 20 19 18 17 | 16 15 14 13 | 12 11 10 9 | 8 7 | 6 | 5 | 4 3 2 1 0 |
|---|---|---|---|---|---|---|---|---|---|---|
| | 0 0 sw | rel dest reg | shift amount | | A rel source | immediate | | 1 | 1 | ALUop |

| ALU/SHIFT (set cc) | 31 30 29 28 27 | 26 25 24 23 | 22 21 | 20 19 18 17 | 16 15 14 13 | 12 11 10 9 | 8 7 | 6 5 | 4 3 2 1 0 |
|---|---|---|---|---|---|---|---|---|---|
| | 1 0 0 | dest reg | | sw | A absolute source | IoB Abs Sec | Up B Src | ALUop |

Shift Decode:

(rs,r0) decode ([[31:0]] shifts into [63:32] and take [63:32]):

00 = left rotate
    01 = right shift (32-ShfAmt = Right Shift Amt)
    10 = left shift
    11 = double shift ( upper A-op shifts into lower B-op)

==> "left rotate" of zero gives zero shift (therwise zero amount signifies indirect shift)

ALU-OP decode:

| | | | |
|---|---|---|---|
| 0000 = B | 0100 = ~A&B (~and) | 1000 = A-B | 1100 = A+B(8) |
| 0001 = ~B | 0101 =XOR | 1001 = B-A | 1101 = A+B(16) |
| 0010 = A&B (and) | 0110 = OR | 1010 = | 1110 = A+B |
| 0011 = A&~B (and~) | 0111= mul-stuff | 1011 = | 0011 = A+B+Cin |

FIG. 5

DOUBLE SHIFT INSTRUCTION FOR MICRO ENGINE USED IN MULTITHREADED PARALLEL PROCESSOR ARCHITECTURE

This application claims the benefit of Provision application Ser. No. 60/151,961, filed Sep. 1, 1999.

TECHNICAL FIELD

This invention relates to a memory instruction for computer processors.

BACKGROUND

Parallel processing is an efficient form of information processing of concurrent events in a computing process. Parallel processing demands concurrent execution of many programs in a computer, in contrast to sequential processing. In the context of a parallel processor, parallelism involves doing more than one thing at the same time. Unlike a serial paradigm where all tasks are performed sequentially at a single station or a pipelined machine where tasks are performed at specialized stations, with parallel processing, a number of stations are provided with each capable of performing all tasks. That is, in general all or a number of the stations work simultaneously and independently on the same or common elements of a problem. Certain problems are suitable for solution by applying parallel processing.

DESCRIPTION OF DRAWINGS

The foregoing features and other aspects of the invention will be described further in detail by the accompanying drawings, in which:

FIG. 5 is a block diagram illustrating a format for arithmetic logic unit instruction results.

Like reference symbols in the various drawings indicate like elements.

DETAILED DESCRIPTION

Figure 1:
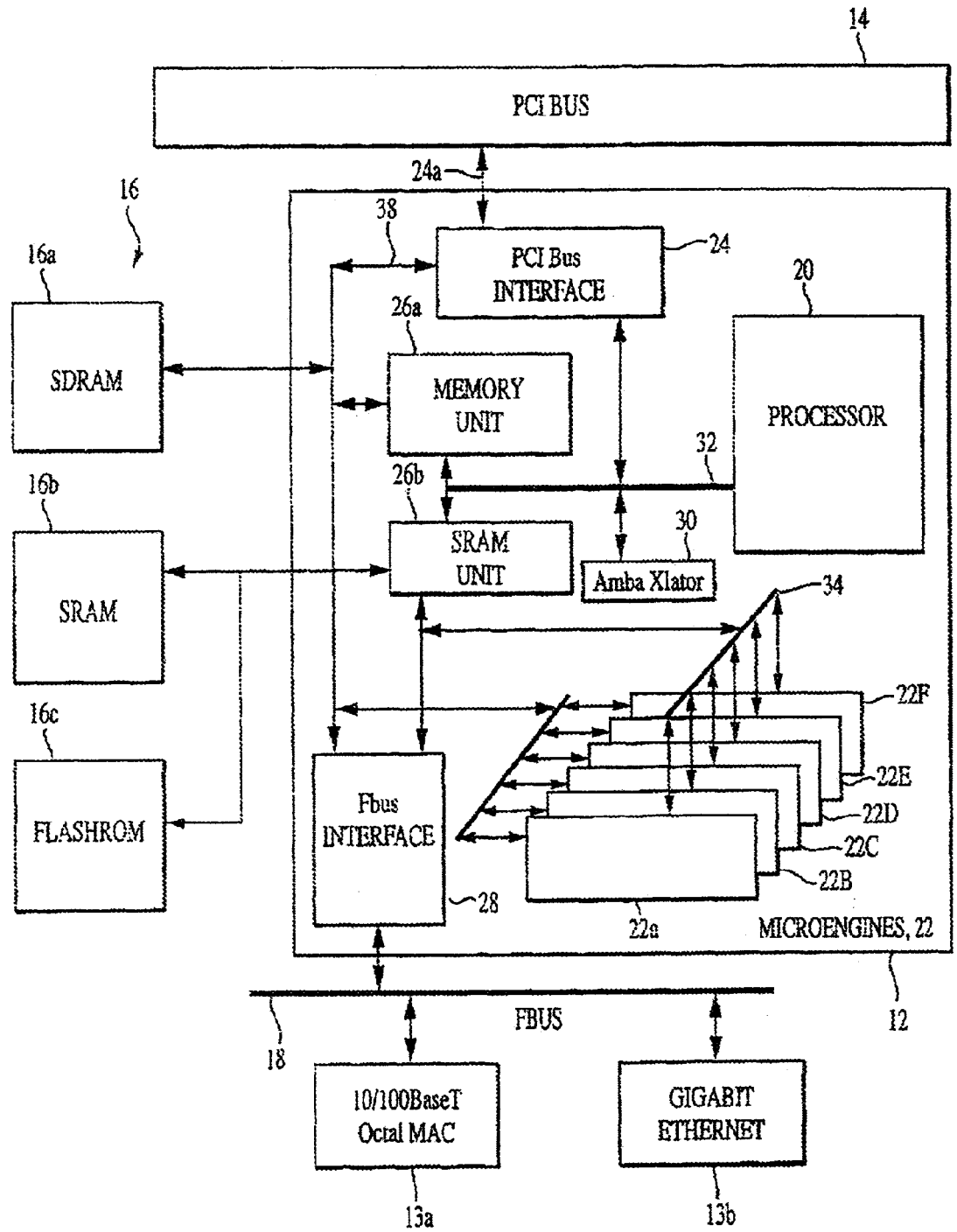
FIG. 1 is a block diagram of a communication system employing a hardware-based multithreaded processor.

Referring to FIG. 1, a communication system 10 includes a parallel, hardware-based multithreaded processor 12. The hardware-based multithreaded processor 12 is coupled to a bus such as a PCI bus 14, a memory system 16 and a second bus 18. The system 10 is especially useful for tasks that can be broken into parallel subtasks or functions. Specifically, hardware-based multithreaded processor 12 is useful for tasks that are bandwidth oriented rather than latency oriented. The hardware-based multithreaded processor 12 has multiple micro engines 22 each with multiple hardware controlled threads that can be simultaneously active and independently work on a task.

The hardware-based multithreaded processor 12 also includes a central controller 20 that assists in loading micro code control for other resources of the hardware-based multithreaded processor 12 and performs other general purpose computer type functions such as handling protocols, exceptions, extra support for packet processing where the micro engines 22 pass the packets off for more detailed processing such as in boundary conditions. In one embodiment, the processor 20 is a Strong Arm® (Arm is a trademark of ARM Limited, United Kingdom) based architecture. The general-purpose microprocessor 20 has an operating system. Through the operating system the processor 20 can call functions to operate on micro engines 22a–22f. The processor 20 can use any supported operating system, preferably a real time operating system. For the core processor 20 implemented as Strong Arm architecture, operating systems such as, Microsoft-NT real-time, VXWorks and µCUS, a freeware operating system as available over the Internet, can be used.

Functional micro engines (micro engines) 22a–22f each maintain program counters in hardware and states associated with the program counters. Effectively, a corresponding number of sets of threads can be simultaneously active on each of the micro engines 22a–22f while only one is actually operating at any one time.

In an embodiment, there are six micro engines 22a–22f as shown. Each micro engine 22a–22f has capabilities for processing four hardware threads. The six micro engines 22a–22f operate with shared resources including memory system 16 and bus interfaces 24 and 28. The memory system 16 includes a Synchronous Dynamic Random Access Memory (SDRAM) controller 26a and a Static Random Access Memory (SRAM) controller 26b. SDRAM memory 16a and SDRAM controller 26a are typically used for processing large volumes of data, e.g., processing of network payloads from network packets. The SRAM controller 26b and SRAM memory 16b are used in a networking implementation for low latency, fast access tasks, e.g., accessing look-up tables, memory for the core processor 20, and so forth.

The six micro engines 22a–22f access either the SDRAM 16a or SRAM 16b based on characteristics of the data. Thus, low latency, low bandwidth data is stored in and fetched from SRAM 16b, whereas higher bandwidth data for which latency is not as important, is stored in and fetched from SDRAM 16a. The micro engines 22a–22f can execute memory reference instructions to either the SDRAM controller 26a or SRAM controller 16b.

Advantages of hardware multithreading can be explained by SRAM or SDRAM memory accesses. As an example, an SRAM access requested by a Thread_0, from a micro engine will cause the SRAM controller 26b to initiate an access to the SRAM memory 16b. The SRAM controller 26b controls arbitration for the SRAM bus, accesses the SRAM 16b, fetches the data from the SRAM 16b, and returns data to a requesting micro engine 22a–22f. During an SRAM access, if the micro engine, e.g., micro engine 22a, had only a single thread that could operate, that micro engine would be dormant until data was returned from the SRAM 16b. By employing hardware context swapping within each of the micro engines 22a–22f, the hardware context swapping enables other contexts with unique program counters to execute in that same micro engine. Thus, another thread, e.g., Thread_1 can function while the first thread, i.e., Thread_0, is awaiting the read data to return. During execution, Thread_1 may access the SDRAM memory 16a. While Thread_1 operates on the SDRAM unit 16a, and Thread_0 is operating on the SRAM unit 16b, a new thread, e.g., Thread_2 can now operate in the micro engine 22a. Thread_2 can operate for a certain amount of time until it needs to access memory or perform some other long latency operation, such as making an access to a bus interface. Therefore, simultaneously, the processor 12 can have a bus operation, SRAM operation and SDRAM operation all being completed or operated upon by one micro engine 22a and have one more thread available to process more work in the data path.

The hardware context swapping also synchronizes completion of tasks. For example, two threads could hit the same shared resource e.g., SRAM 16b. Each one of these separate functional units, e.g., the FBUS interface 28, the SRAM controller 26a, and the SDRAM controller 26b, when they complete a requested task from one of the micro engine thread contexts reports back a flag signaling completion of an operation. When the micro engine receives the flag, the micro engine can determine which thread to turn on.

An application for the hardware-based multithreaded processor 12 is as a network processor. As a network processor, the hardware-based multithreaded processor 12 interfaces to network devices such as a media access controller device e.g., a 10/100BaseT Octal MAC 13a or a Gigabit Ethernet device 13b. In general, as a network processor, the hardware-based multithreaded processor 12 can interface to any type of communication device or interface that receives/sends large amounts of data. Communication system 10 functioning in a networking application could receive network packets from the devices 13a, 13b and process those packets in a parallel manner. With the hardware-based multithreaded processor 12, each network packet can be independently processed.

Another example for use of processor 12 is a print engine for a postscript processor or as a processor for a storage subsystem, e.g., Redundant Array of Independent Disk (RAID) storage, a category of disk drives that employs two or more drives in combination for fault tolerance and performance. A further use is as a matching engine. In the securities industry for example, the advent of electronic trading requires the use of electronic matching engines to match orders between buyers and sellers. These and other parallel types of tasks can be accomplished utilizing the system 10.

The processor 12 includes the bus interface 28 that couples the processor to the second bus 18. In an embodiment, bus interface 28 couples the processor 12 to the FBUS (FIFO bus 18. The FBUS interface 28 is responsible for controlling and interfacing the processor 12 to the FBUS 18. The FBUS 18 is a 64-bit wide FIFO bus, used to interface to Media Access Controller (MAC) devices, e.g., 10/100 Base T Octal MAC 13a.

The processor 12 includes a second interface e.g., PCI bus interface 24, that couples other system components that reside on the PCI 14 bus to the processor 12. The PCI bus interface 24 provides a high-speed data path 24a to memory 16, e.g., SDRAM memory 16a. Through PCI bus interface 24 data can be moved quickly from the SDRAM 16a through the PCI bus 14, via direct memory access (DMA) transfers. The hardware based multithreaded processor 12 supports image transfers. The hardware based multithreaded processor 12 can employ DMA channels so if one target of a DMA transfer is busy, another one of the DMA channels can take over the PCI bus 14 to deliver information to another target to maintain high processor 12 efficiency. Additionally, the PCI bus interface 24 supports target and master operations. Target operations are operations where slave devices on bus 14 access SDRAMs through reads and writes that are serviced as a slave to a target operation. In master operations, the processor core 20 sends data directly to or receives data directly from the PCI interface 24.

Each of the functional units 22 is coupled to one or more internal buses. As described below, the internal buses are dual, 32 bit buses (i.e., one bus for read and one for write). The hardware-based multithreaded processor 12 also is constructed such that the sum of the bandwidths of the internal buses in the processor 12 exceed the bandwidth of external buses coupled to the processor 12. The processor 12 includes an internal core processor bus 32, e.g., an ASB Advanced System Bus (ASB), that couples the processor core 20 to the memory controller 26a, 26b and to an ASB translator 30, described below. The ASB bus 32 is a subset of the so-called Advanced Microcontroller Bus Architecture (AMBA) bus that is used with the Strong Arm processor core 20. AMBA is an open standard, on-chip bus specification that details a strategy for the interconnection and management of functional blocks that makes up a System-on-chip (SoC). The processor 12 also includes a private bus 34 that couples the micro engine units 22 to SRAM controller 26b, ASB translator 30 and FBUS interface 28. A memory bus 38 couples the memory controller 26a, 26b to the bus interfaces 24 and 28 and memory system 16 including flashrom 16c that is used for boot operations and so forth.

Figures 1, 2:
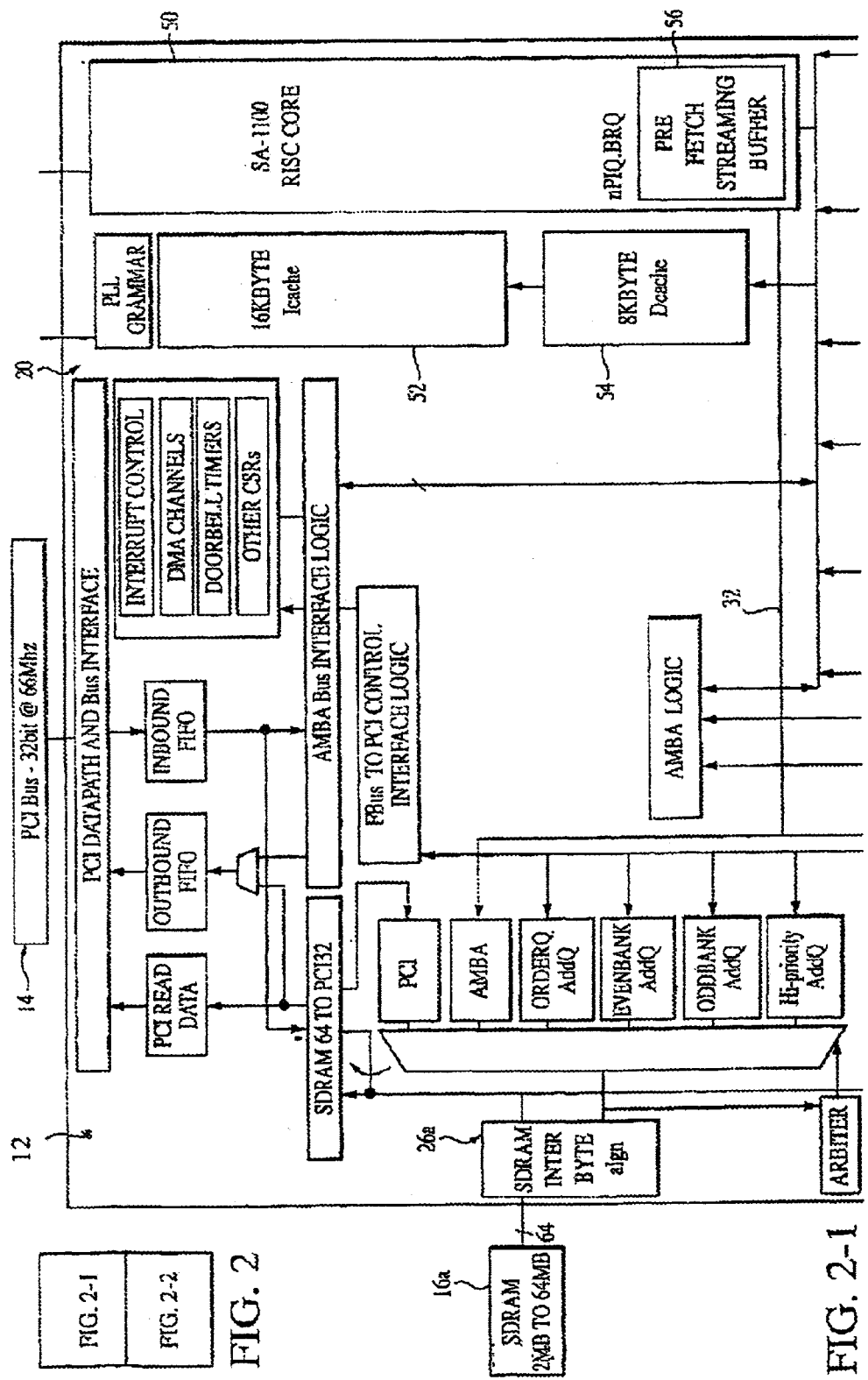
FIG. 2 is a detailed block diagram of the hardware-based multithreaded processor of FIG. 1.
Figure 2:
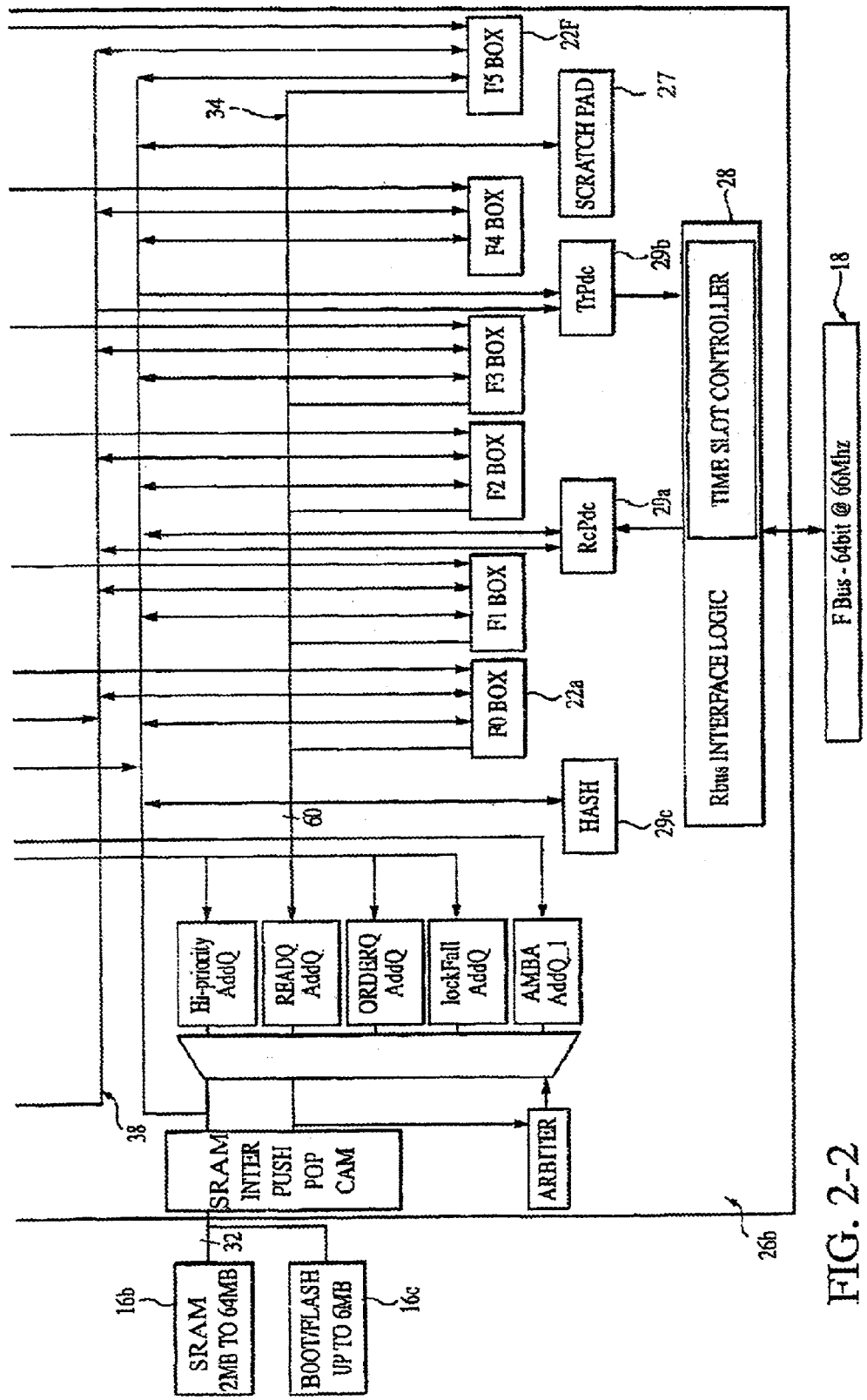

Referring to FIG. 2, each of the micro engines 22a–22f includes an arbiter that examines flags to determine the available threads to be operated upon. Any thread from any of the micro engines 22a–22f can access the SDRAM controller 26a, SDRAM controller 26b or FBUS interface 28. The memory controllers 26a and 26b each include queues to store outstanding memory reference requests. The queues either maintain order of memory references or arrange memory references to optimize memory bandwidth. For example, if a thread_0 has no dependencies or relationship to a thread_1, there is no reason that thread_1 and thread_0 cannot complete their memory references to the SRAM unit 16b out of order. The micro engines 22a–22f issue memory reference requests to the memory controllers 26a and 26b. The micro engines 22a–22f flood the memory subsystems 26a and 26b with enough memory reference operations such that the memory subsystems 26a and 26b become the bottleneck for processor 12 operation.

If the memory subsystem 16 is flooded with memory requests that are independent in nature, the processor 12 can perform memory reference sorting. Memory reference sorting improves achievable memory bandwidth. Memory reference sorting, as described below, reduces dead time or a bubble that occurs with accesses to SRAM 16b. With memory references to SRAM 16b, switching current direction on signal lines between reads and writes produces a bubble or a dead time waiting for current to settle on conductors coupling the SRAM 16b to the SRAM controller 26b.

That is, the drivers that drive current on the bus need to settle out prior to changing states. Thus, repetitive cycles of a read followed by a write can degrade peak bandwidth. Memory reference sorting allows the processor 12 to organize references to memory such that long strings of reads can be followed by long strings of writes. This can be used to minimize dead time in the pipeline to effectively achieve closer to maximum available bandwidth. Reference sorting helps maintain parallel hardware context threads. On the SDRAM 16a, reference sorting allows hiding of pre-charges from one bank to another bank. Specifically, if the memory system 16b is organized into an odd bank and an even bank, while the processor is operating on the odd bank, the memory controller can start pre-charging the even bank. Pre-charging is possible if memory references alternate between odd and even banks. By ordering memory references to alternate accesses to opposite banks, the processor 12 improves SDRAM bandwidth. Additionally, other optimizations can be used. For example, merging optimizations where operations that can be merged, are merged prior to memory access, open page optimizations where by examining addresses an opened page of memory is not reopened, chaining, as will be described below, and refreshing mechanisms, can be employed.

The FBUS interface 28 supports Transmit and Receive flags for each port that a MAC device supports, along with an Interrupt flag indicating when service is warranted. The FBUS interface 28 also includes a controller 28a that performs header processing of incoming packets from the FBUS 18. The controller 28a extracts the packet headers and performs a micro programmable source/destination/protocol hashed lookup (used for address smoothing) in SRAM 16b. If the hash does not successfully resolve, the packet header is sent to the processor core 20 for additional processing. The FBUS interface 28 supports the following internal data transactions:

| FBUS unit | (Shared bus SRAM) | to/from micro engine. |
|---|---|---|
| FBUS unit | (via private bus) | writes from SDRAM Unit. |
| FBUS unit | (via Mbus) | Reads to SDRAM. |

The FBUS 18 is a standard industry bus and includes a data bus, e.g., 64 bits wide and sideband control for address and read/write control. The FBUS interface 28 provides the ability to input large amounts of data using a series of input and output FIFOs 29a–29b. From the FIFOs 29a–29b, the micro engines 22a–22f fetch data from or command the SDRAM controller 26a to move data from a receive FIFO in which data has come from a device on bus 18, into the FBUS interface 28. The data can be sent through memory controller 26a to SDRAM memory 16a. via a direct memory access. Similarly, the micro engines can move data from the SDRAM 26a to interface 28, out to FBUS 18, via the FBUS interface 28.

Data functions are distributed amongst the micro engines 22. Connectivity to the SRAM 26a, SDRAM 26b and FBUS 28 is via command requests. A command request can be a memory request or a FBUS request. For example, a command request can move data from a register located in a micro engine 22a to a shared resource, e.g., an SDRAM location, SRAM location, flash memory or some MAC address. The commands are sent out to each of the functional units and the shared resources. However, the shared resources do not need to maintain local buffering of the data. Rather, the shared resources access distributed data located inside of the micro engines 22a–2f. This enables micro engines 22a–22f, to have local access to data rather than arbitrating for access on a bus and risk contention for the bus. With this feature, there is a zero cycle stall for waiting for data internal to the micro engines 22a–22f.

The data buses, e.g., ASB bus 30, SRAM bus 34 and SDRAM bus 38 coupling these shared resources, e.g., memory controllers 26a and 26b, are of sufficient bandwidth such that there are no internal bottlenecks. In order to avoid bottlenecks, the processor 12 has a bandwidth requirement where each of the functional units is provided with at least twice the maximum bandwidth of the internal buses. As an example, the SDRAM 16a can ran a 64 bit wide bus at 83 MHz. The SRAM data bus could have separate read and write buses, e.g., could be a read bus of 32 bits wide running at 166 MHz and a write bus of 32 bits wide at 166 MHz. That is, in essence, 64 bits running at 166 MHz that is effectively twice the bandwidth of the SDRAM.

The core processor 20 also can access the shared resources. The core processor 20 has a direct communication to the SDRAM controller 26a to the bus interface 24 and to SRAM controller 26b via bus 32. However, to access the micro engines 22a–22f and transfer registers located at any of the micro engines 22a–22f, the core processor 20 access the micro engines 22a–22f via the ASB Translator 30 over bus 34. The ASB translator 30 can physically reside in the FBUS interface 28, but logically is distinct. The ASB Translator 30 performs an address translation between FBUS micro engine transfer register locations and core processor addresses (i.e., ASB bus) so that the core processor 20 can access registers belonging to the micro engines 22a–22f.

Although micro engines 22a–22f can use the register set to exchange data as described below, a scratchpad memory 27 is also provided to permit micro engines 22a–22f to write data out to the memory for other micro engines to read. The scratchpad 27 is coupled to bus 34.

The processor core 20 includes a RISC core 50 implemented in a five stage pipeline performing a single cycle shift of one operand or two operands in a single cycle, provides multiplication support and 32 bit barrel shift support. This RISC core 50 is a standard Strong Arm architecture but it is implemented with a five-stage pipeline for performance reasons. The processor core 20 also includes a 16-kilobyte instruction cache 52, an 8-kilobyte data cache 54 and a prefetch stream buffer 56. The core processor 20 performs arithmetic operations in parallel with memory writes and instruction fetches. The core processor 20 interfaces with other functional units via the ARM defined ASB bus. The ASB bus is a 32-bit bi-directional bus 32.

Figure 3:
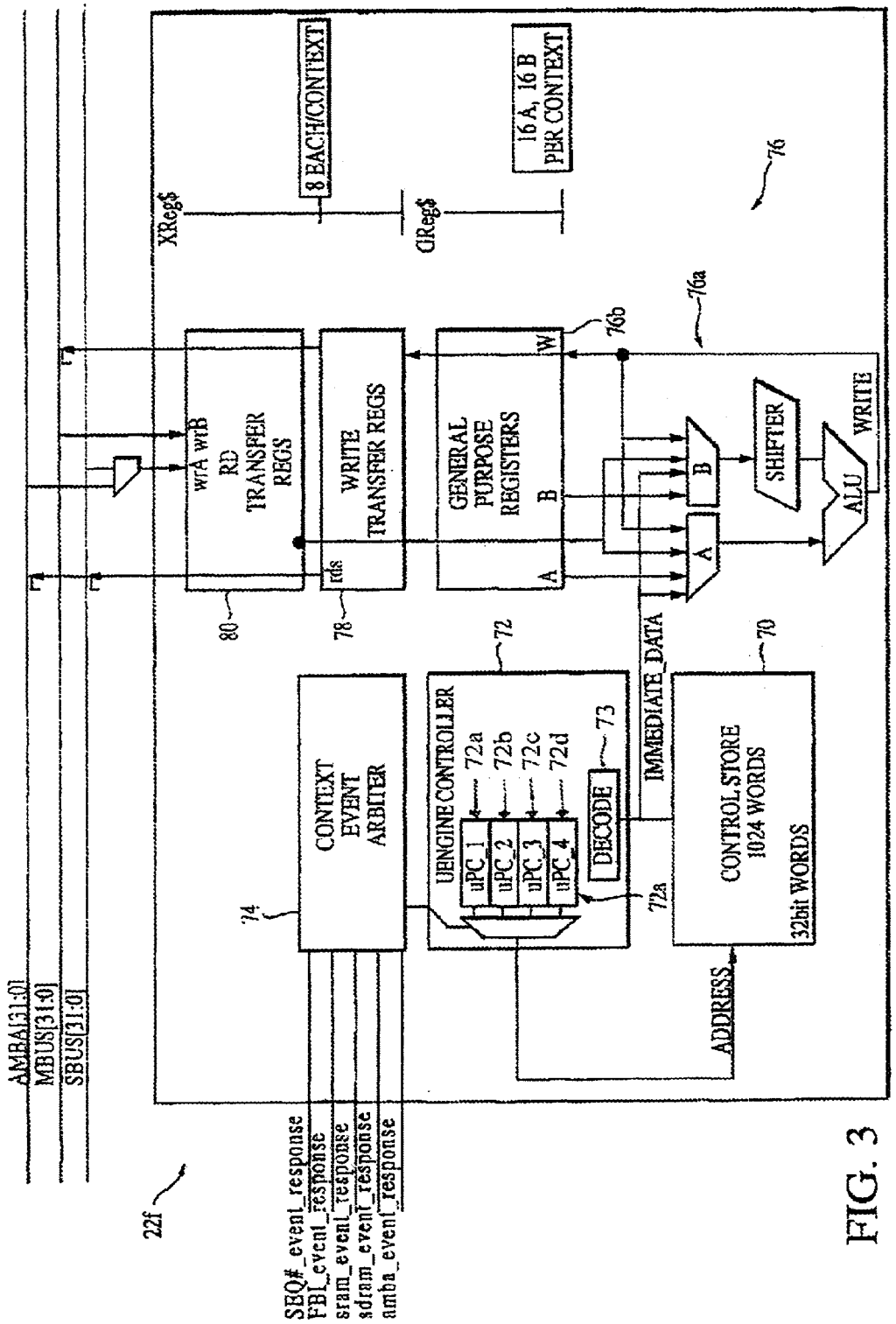
FIG. 3 is a block diagram of a micro engine functional unit employed in the hardware-based multithreaded processor of FIGS. 1 and 2.

Referring to FIG. 3, an exemplary one of the micro engines 22a–22f, e.g., micro engine 22f, is shown. The micro engine 22f includes a control store 70, which, in one implementation, includes a RAM of here 1,024 words of 32 bit. The RAM stores a micro program (not shown). The micro program is loadable by the core processor 20. The micro engine 22f also includes controller logic 72. The controller logic 72 includes an instruction decoder 73 and program counter (PC) units 72a–72d. The four micro program counters 72a–72d are maintained in hardware. The micro engine 22f also includes context event switching logic 74. Context event logic 74 receives messages (e.g., SEQ_=_EVENT_RESPONSE; FBI_EVENT_RESPONSE; SRAM_EVENT_RESPONSE; SDRAM_EVENT_RESPONSE; and ASB_EVENT_RESPONSE) from each one of the shared resources, e.g., SRAM 26a, SDRAM 26b, or processor core 20, control and status registers, and so forth. These messages provide information on whether a requested function has completed. Based on whether or not a function requested by a thread has completed and signaled completion, the thread needs to wait for that completion signal, and if the thread is enabled to operate, then the thread is placed on an available thread list (not shown). The micro engine 22f can have a maximum of four threads available.

In addition to event signals that are local to an executing thread, the micro engines 22a–22f employ signaling states that are global. With signaling states, an executing thread can broadcast a signal state to all micro engines 22a–22f, e.g., Receive Request Available (RRA) signal, any and all threads in the micro engines 22a–22f can branch on these signaling states. These signaling states can be used to determine availability of a resource or whether a resource is due for servicing.

The context event logic 74 has arbitration for the four threads. In an embodiment, the arbitration is a round robin mechanism. Other techniques could be used including priority queuing or weighted fair queuing. The micro engine 22f also includes an execution box (EBOX) data path 76 that includes an arithmetic logic unit (ALU) 76a and general-purpose register set 76b. The ALU 76a performs arithmetic and logical functions as well as shift functions. The register set 76b has a relatively large number of general-purpose registers. In an embodiment, there are 64 general-purpose registers in a first bank, Bank A and 64 in a second bank, Bank B. The general-purpose registers are windowed so that they are relatively and absolutely addressable.

The micro engine 22f also includes a write transfer register stack 78 and a read transfer stack 80. These registers 78 and 80 are also windowed so that they are relatively and absolutely addressable. Write transfer register stack 78 is where write data to a resource is located. Similarly, read register stack 80 is for return data from a shared resource. Subsequent to or concurrent with data arrival, an event signal from the respective shared resource e.g., the SRAM controller 26a, SDRAM controller 26b or core processor 20 will be provided to context event arbiter 74, which will then alert the thread that the data is available or has been sent. Both transfer register banks 78 and 80 are connected to the execution box (EBOX) 76 through a data path. In an embodiment, the read transfer register has 64 registers and the write transfer register has 64 registers.

Figure 4:
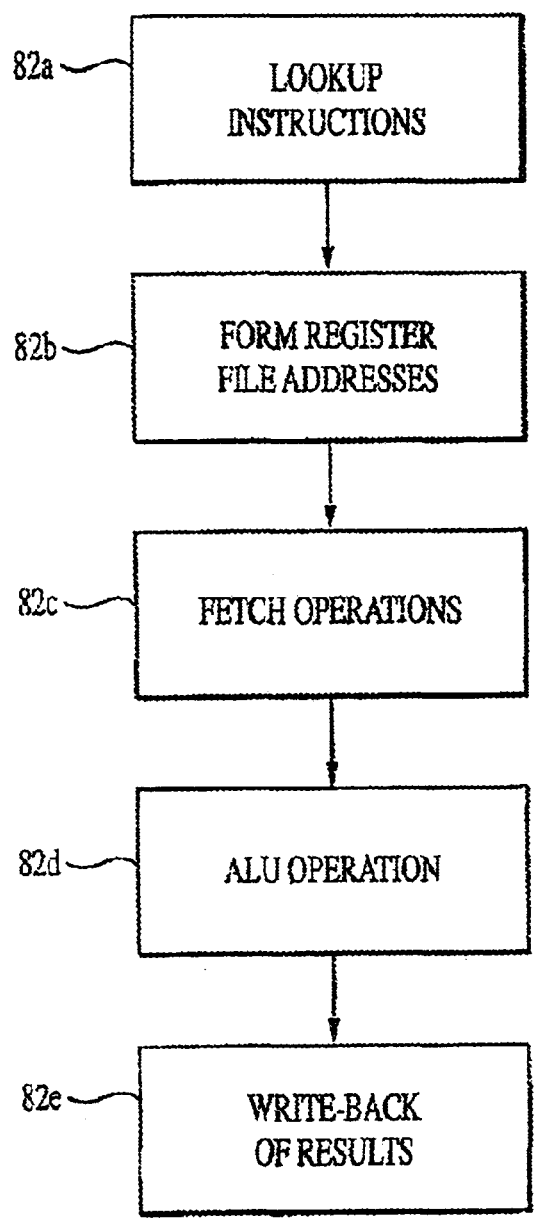
FIG. 4 is a block diagram of a pipeline in the micro engine of FIG. 3.

Referring to FIG. 4, the micro engine data path maintains a 5-stage micro-pipeline 82. This pipeline includes lookup of microinstruction words 82a, formation of the register file addresses 82b, read of operands from register file 82c, ALU shift or compare operations 82d, and write-back of results to registers 82e. By providing a write-back data bypass into the ALU/shifter units, and by assuming the registers are implemented as a register file (rather than a RAM), the micro engine 22f can perform a simultaneous register file read and write, which completely hides the write operation.

The SDRAM interface 26a provides a signal back to the requesting micro engine on reads that indicates whether a parity error occurred on the read request. The micro engine micro code is responsible for checking the SDRAM 16a read Parity flag when the micro engine uses any return data. Upon checking the flag, if it was set, the act of branching on it clears it. The Parity flag is only sent when the SDRAM 16a is enabled for checking, and the SDRAM 16a is parity protected. The micro engines 22 and the PCI Unit 14 are the only requestors notified of parity errors. Therefore, if the processor core 20 or FIFO 18 requires parity protection, a micro engine assists in the request. The micro engines 22a–22f support conditional branches.

Referring to FIG. 5, a format for arithmetic logic unit instruction is shown. The micro engines 22 support various instruction sets. The instruction set includes logical and arithmetic operations that perform an ALU operation on one or two operands and deposit the result into the destination register, and update all ALU condition codes according to the result of the operation. Condition codes are lost during context swaps. When the op code bits 28:27 are 1:1 the instruction is a double shift instruction.

The instruction set includes a double shift instruction, i.e., DBL_SHF, which concatenates two long words (i.e., two 32 bit words) and shifts the result and saves the result as a longword. In the double shift instruction, the upper A-op shifts into lower B-op, with a "left rotate" of zero giving a zero shift (otherwise zero amount signifies indirect shift).

The DBL_SHF instruction loads a destination register with a 32-bit longword that is formed by concatenating the A operands and B operands together, right shifting the 64-bit quantity by the specified amount, and storing the lower 32 bits.

A format of the double shift instruction is: dbl_shf[dest_reg, A_operand, B_operand, A_op_shf_cntl], where each of the fields is described fully below.

A "dest_req" field represents the destination, i.e., an absolute or context-relative register name.

A "A_operand" field represents a context-relative register name, i.e., 5-bit zero-filled immediate data.

A "B_oprand" field represents a context-relative register name, i.e., 5-bit zero-filled immediate data.

A "A_op_shf_cntl" field represents a right shift of values from 1 to 31.

By way of example, if a=0x87654321 and b=0xFEDCBA98, then dbl_shf[c, a, b, >>12] stores 0x321FEDCB in c. The ALU condition codes are updated based on the result.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A hardware-based multithreaded processor comprising:
   a plurality of microengines, each of the microengines comprising:
   a control store;
   controller logic;
   context event switching logic; and
   an execution box data path including an arithmetic logic unit (ALU) and a general purpose register set, the ALU performing functions in response to instructions, one of the instructions causing the ALU to load a destination register with a 32-bit word formed by concatenating a first operand and a second operand to form a 64-bit result, shifting the 64-bit result by a specified amount, and storing a lower 32-bits of the 64-bit result.

2. The processor of claim 1 wherein the first operand is a context-relative 32-bit register.

3. The processor of claim 1 wherein the second operand is a context-relative 32-bit register.

4. The processor of claim 1 wherein the shifting is a right shifting.

5. The processor of claim 1 wherein the destination register is an absolute register name.

6. The processor of claim 1 wherein the destination register is a context relative register name.

7. The processor of claim 1 wherein the destination register is a context-relative 32-bit register.

8. The processor of claim 1 wherein the specified amount is a value contained in the first operand.

9. The processor of claim 1 wherein the specified amount is a value contained in a lower five bits of the first operand.

10. The processor of claim 1 wherein the specified amount is a value representing a right shift of values from 1 to 31.

* * * * *